United States Patent
Goldfish et al.

(10) Patent No.: US 12,425,459 B2
(45) Date of Patent: Sep. 23, 2025

(54) APPARATUS, SYSTEM AND METHOD OF BLUETOOTH ROLE SWITCH

(71) Applicant: INTEL CORPORATION, Santa Clara, CA (US)

(72) Inventors: Nir Goldfish, Petah Tikva (IL); Sunil Kumar, Cupertino, CA (US); Nir Balaban, Kfar Netter (IL); Oren Haggai, Kefar Sava (IL); Hakan Magnus Eriksson, Portland, OR (US); Prasanna Desai, Elfin Forest, CA (US); Srinivas Krovvidi, Telengana (IN)

(73) Assignee: INTEL CORPORATION, Santa Clara, CA (US)

( * ) Notice: Subject to any disclaimer, the term of this patent is extended or adjusted under 35 U.S.C. 154(b) by 669 days.

(21) Appl. No.: 17/561,537

(22) Filed: Dec. 23, 2021

(65) Prior Publication Data

US 2023/0208892 A1 Jun. 29, 2023

(51) Int. Cl.
*H04L 65/1083* (2022.01)
*G06F 13/10* (2006.01)
*H04W 4/80* (2018.01)

(52) U.S. Cl.
CPC ........ *H04L 65/1083* (2013.01); *G06F 13/102* (2013.01); *H04W 4/80* (2018.02)

(58) Field of Classification Search
CPC ..... H04L 65/1083; G06F 13/102; H04W 4/80
USPC .................................................. 455/41.2
See application file for complete search history.

(56) References Cited

U.S. PATENT DOCUMENTS

| | | | |
|---|---|---|---|
| 9,609,465 B2 * | 3/2017 | Hsieh | H04M 1/6066 |
| 10,200,843 B1 * | 2/2019 | Chen | H04W 76/14 |
| 10,631,363 B1 * | 4/2020 | Xian | H04M 1/6066 |
| 2006/0072525 A1 * | 4/2006 | Hillyard | H04W 84/20 370/338 |
| 2018/0184234 A1 * | 6/2018 | Chen | H04W 76/14 |
| 2020/0252993 A1 * | 8/2020 | Srivastava | H04W 36/304 |
| 2020/0322788 A1 * | 10/2020 | Batra | H04W 8/24 |
| 2020/0374820 A1 * | 11/2020 | Srivastava | H04L 5/0055 |
| 2022/0159782 A1 * | 5/2022 | Ouyang | H04W 84/20 |

OTHER PUBLICATIONS

Bluetooth Core Specification V 5.0, Dec. 6, 2016, 2822 pages.

* cited by examiner

*Primary Examiner* — Juan A Torres
(74) *Attorney, Agent, or Firm* — Shichrur & Co.

(57) ABSTRACT

For example, a first Bluetooth (BT) device may be configured to operate in a role of a peripheral device over a BT link between the first BT device and a second BT device; and to initiate a role switch to switch the first BT device from the role of the peripheral device to a role of a central device over the BT link between the first BT device and the second BT device, based on a determination that the BT link between the first BT device and the second BT device is to be operated as an audio link to communicate audio data between the first BT device, as an audio source, and the second BT device, as an audio sink.

24 Claims, 8 Drawing Sheets

Fig. 2

APPARATUS, SYSTEM AND METHOD OF BLUETOOTH ROLE SWITCH

TECHNICAL FIELD

Aspects described herein generally relate to Bluetooth role switch.

BACKGROUND

A first Bluetooth device may be connected to and/or paired with a second Bluetooth device, for example, to transfer data between the first and second Bluetooth devices.

When setting up a Bluetooth connection between two Bluetooth devices, one of the Bluetooth devices may assume a role of a central device and another one of the Bluetooth devices may assume a role of a peripheral device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of an allocation of Bluetooth (BT) slots of a BT device communicating over two links, to illustrate a technical issue, which may be addressed in accordance with some demonstrative aspects.

DETAILED DESCRIPTION

Figure 1:
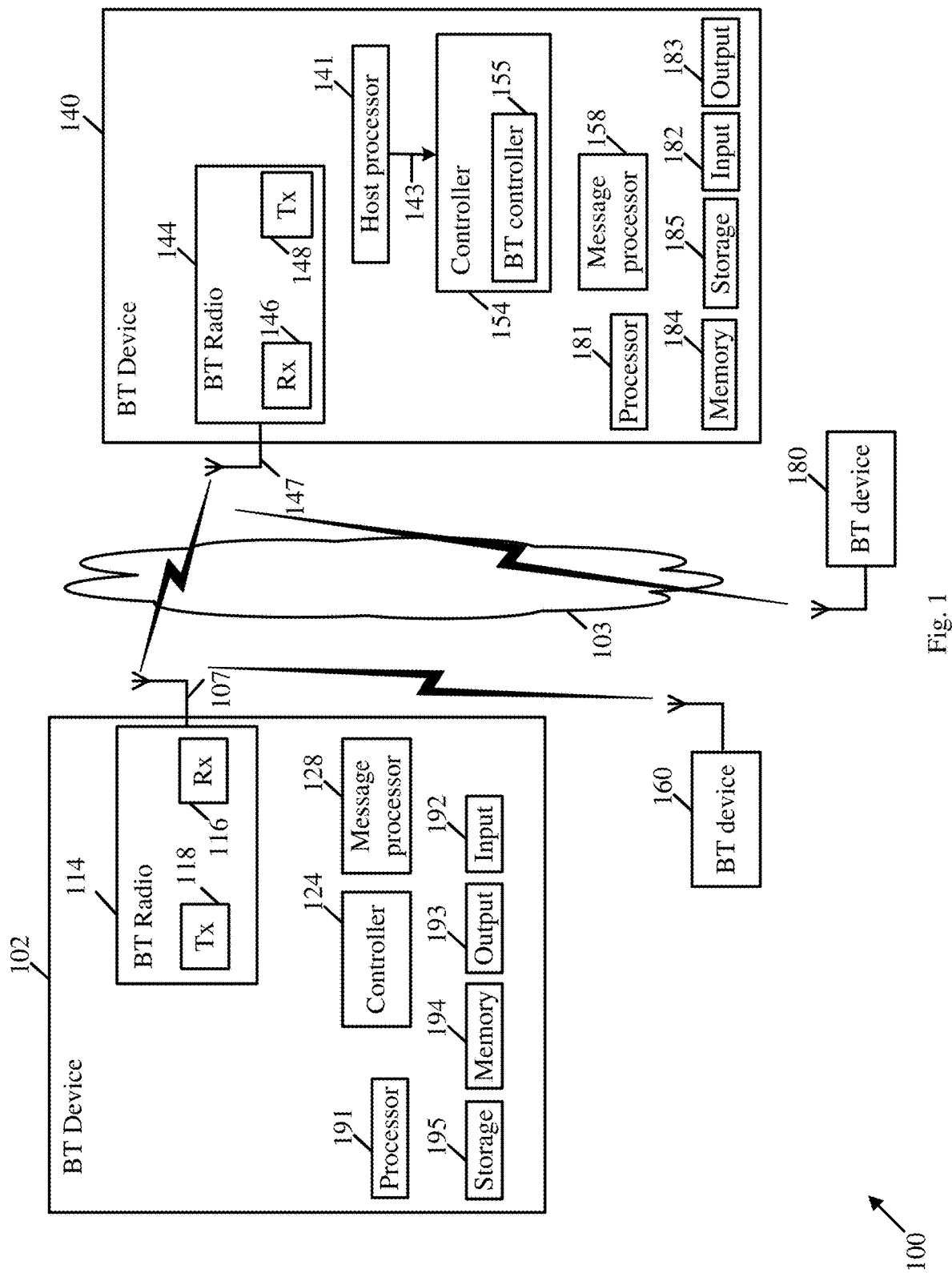
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2020 (IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December 2020)) and/or future versions and/or derivatives thereof, devices and/or networks operating in accordance with existing cellular specifications and/or protocols, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102, 140, 160 and/or 180.

In some demonstrative aspects, devices 102, 140, 160 and/or 180 may include, operate as, and/or perform the functionality of one or more BT devices.

In some demonstrative aspects, devices 102, 140, 160 and/or 180 may include a BT mobile device. In other aspects, devices 102, 140, 160 and/or 180 may include may include a non-mobile BT device.

In one example, devices 102, 140, 160 and/or 180 may include BT Low Energy (LE) (BLE) compatible devices. In other aspects, devices 102, 140, 160 and/or 180 may include or implement any other additional or alternative BT communication functionality, e.g., according to any other additional or alternative BT protocol.

In some demonstrative aspects, device 102 may include, operate as, and/or perform the functionality of, a BT audio device. For example, the BT audio device may include a BT headset, a BT headphone, a BT earphone, a BT hands-free device, a voice-controlled device, a smart speaker device, a sensor device, a BT A/V device, a device incorporating a BT audio device, and/or any other audio device, which may be configured to communicate audio traffic with BT device 140, e.g., as described below.

In some demonstrative aspects, devices 140, 160, and/or 180 may include, for example, a UE, an MD, a STA, a PC, a desktop computer, a mobile computer, a laptop computer, an Ultrabook™ computer, a notebook computer, a tablet computer, a server computer, a handheld computer, a Smartphone, a mobile phone, a cellular telephone, a Human Interface Device (HID), a sensor device, a handheld device, a wearable device, an on-board device, an off-board device, a hybrid device, a consumer device, a vehicular device, a non-vehicular device, a mobile or portable device, a non-mobile or non-portable device, a video device, an audio device, an A/V device, a media player, a television, a music player, or the like.

In some demonstrative aspects, devices 102, 140, 160 and/or 180 may include, operate as, and/or perform the functionality of one or more STAs. For example, device 102 may include at least one STA, and/or device 140 may include at least one STA.

In some demonstrative aspects, devices 102, 140, 160 and/or 180 may include, operate as, and/or perform the functionality of one or more WLAN STAs.

In some demonstrative aspects, devices 102, 140, 160 and/or 180 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102, 140, 160 and/or 180 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of device 102 and/or device 140 may be enclosed in a common housing or packaging, and may be interconnected or operably associated using one or more wired or wireless links. In other aspects, components of device 102 and/or device 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, 160 and/or 180 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102, 140, 160 and/or 180 may include one or more BT radios including circuitry and/or logic to perform wireless communication between devices 102, 140 and/or one or more other BT devices. For example, device 102 may include at least one BT radio 114, and/or device 140 may include at least one BT radio 144.

In some demonstrative aspects, devices 102, 140, 160 and/or 180 may include one or more other radios, e.g., a WiFi radio, an OFDM radio, a cellular radio, and/or the like.

In some demonstrative aspects, BT radio 114 and/or BT radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, BT radio 114 and/or BT radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, BT radio 114, BT radio 144, transmitter 118, transmitter 148, receiver 116, and/or receiver 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 and/or BT radio 144 may be configured to communicate over a 2.4 GHz band, and/or any other band.

In some demonstrative aspects, BT radio 114 and/or BT radio 144 may include, or may be associated with, one or more antennas. For example, BT radio 114 may include, or may be associated with, one or more antennas 107; and/or BT radio 144 may include, or may be associated with, one or more antennas 147.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT audio device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, controller 154 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of controller 154. Additionally or alternatively, one or more functionalities of controller 154 may be implemented by logic, which may be executed by a machine and/or one or more processors, e.g., as described below.

In one example, controller 154 may include circuitry and/or logic, for example, one or more processors including circuitry and/or logic, to cause, trigger and/or control a BT audio device, e.g., device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In other aspects, controller 124, message processor 128 and/or BT radio 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of BT radio 144. For example, the chip or SoC may include one or more elements of controller 154, one or more elements of message processor 158, and/or one or more elements of BT radio 144. In one example, controller 154, message processor 158, and BT radio 144 may be implemented as part of the chip or SoC.

In other aspects, controller 154, message processor 158 and/or BT radio 144 may be implemented by one or more additional or alternative elements of device 140.

In some demonstrative aspects, devices 102, 140, 160 and/or 180 may be configured to communicate according to a role-based BT communication protocol, which may assign roles to BT devices to perform communication over a BT link, e.g., as described below.

In some demonstrative aspects, a BT device, e.g., BT device 102, BT device 140, BT device 160 and/or BT device 180, may be configured to assume a role of a central device or a peripheral device for communication over a BT connection (link).

For example, two BT devices may communicate over a BT link between the two BT devices, where a first BT device of the two BT devices may assume the role of the central device, and a second BT device of the two BT devices may assume the role of the peripheral device.

For example, the BT device assuming the central role may operate as an arbiter on the BT link, for example, to dictate issues such as, for example, a timing of transmission timeslots over the link, Adaptive Frequency Hopping (AFH) channel selection, or the like.

For example, the central device over the BT link, among other things, may control the timing of activities on the BT link.

For example, the link activities over the BT link may be driven based on a BT network clock of the central device, while a peripheral device may synchronize its link timing to the timing if the central device. Accordingly, it may be possible for the central device to "drag" the network activities earlier or later on a particular link, for example, within an allowed timing jitter budget, e.g., in case the central device needs to avoid collision between different links.

For example, the BT device assuming the peripheral role may act as a secondary device, which may follow one or more decisions, e.g., MAC access decisions, channel map decisions, and/or any other decisions, of the central device.

For example, the peripheral device may lack a possibility to manage and/or control timing of communications over the BT link, e.g., to avoid collisions with other links.

In some demonstrative aspects, devices 102, 140, 160 and/or 180 may be configured to communicate according to a BT protocol, which may allow a BT device to maintain different links with different devices, e.g., piconets.

In some demonstrative aspects, devices 102, 140, 160 and/or 180 may be configured to communicate according to a BT protocol, which may allow a BT device to assume a role on a per-link basis, e.g., such that the BT device may be allowed to assume a specific role per each link, in a way that a role of the BT device over a link may be uncorrelated to roles of the BT device on other links. For example, a first BT device may act in the role of the central device on a first BT link with a second BT device, while the first BT device may act in the role of the peripheral device on a second BT link with a third BT device.

In some demonstrative aspects, devices 102, 140, 160 and/or 180 may be configured to communicate according to a BT protocol, which may utilize a role-switching mechanism to allow a BT device, e.g., on either side of the BT link, to request a role switch from its peer.

For example, the role-switching mechanism may be configured to allow a first BT device acting as a peripheral device over a BT link to request a role switch from a second BT device acting as a central device over the BT link. For example, the first BT device may utilize the role switch request to request that the first BT device switch roles with the second BT device, e.g., such that the first BT device may become the central device for the BT link.

For example, the role-switching mechanism may be configured to allow a BT device, which receives a role switch request, to either accept the request and proceed with the role change, or to reject the request. In one example, the decision of the BT device may be policy-based, and/or may not be defined by the BT protocol.

In some demonstrative aspects, in some use cases, scenarios, and/or implementations, there may be a need to provide a technical solution to support improved performance and/or efficient utilization of one or more BT activities of a wireless communication device, e.g., as described below.

In some demonstrative aspects, in some use cases, scenarios, and/or implementations, there may be a need to provide a technical solution to support good user experience in a BT audio connection, e.g., as described below.

In some demonstrative aspects, devices 102, 140, 160 and/or 180 may be configured to utilize a role-switching mechanism, which may be configured to allow a BT device operating as an audio source, e.g., a PC, a mobile phone, or any other device, to act in the role of the central device over a BT link, e.g., as described below.

In some demonstrative aspects, the role-switching mechanism may be configured to allow the BT device operating as the audio source to act in the role of the central device over the BT link, for example, while running an audio call with an audio sink e.g., an Extended Synchronous Connection Orientated (eSCO) call in a Hands-Free-Profile (HFP), as described below.

In some demonstrative aspects, for example, the BT device operating as the audio source, e.g., the PC or phone, may perform arbitration-based Time-Division-Multiplexing (TDM) scheduling to schedule multiple concurrent connections, e.g., Basic Rate (BR), Enhanced Data Rate (EDR), and/or Low Energy, connections, and/or collaborative coexistence of the BT device with one or more other co-located devices, e.g., 2.4 GHz Wi-Fi devices, band 40 LTE devices, or the like.

In some demonstrative aspects, for example, an implementation allowing the BT device operating as the audio source, e.g., the PC or phone, to act in the central role over the BT link, may support a technical solution to allow the BT device, e.g., the PC or phone, to efficiently control and/or maintain the timing of its different peripherals, e.g., a headset, and/or one or more Human-Interface Devices (HIDs), e.g., a keyboard and/or mouse in case of a PC; and/or to efficiently select AFH channel assignment, e.g., for best user experience.

In some demonstrative aspects, for example, in some use cases, scenarios, and/or implementations, there may be one or more inefficiencies, disadvantages and/or technical issues in implementing a BT protocol, which does not define a role assignment policy for audio links.

In some demonstrative aspects, for example, in some use cases, scenarios, and/or implementations, there may be one or more inefficiencies, disadvantages and/or technical issues in implementing a BT protocol, which does not provide a consistent and/o deterministic policy for a role of a BT device with respect to BT link, e.g., as described below.

In some demonstrative aspects, for example, in some use cases, scenarios, and/or implementations, there may be a need to avoid a technical issue of interoperability and/or bad user experience, which may result from an inconsistent definition of the role of a BT device with respect to BT link, e.g., as described below.

For example, an audio source may end up being in the peripheral role or the central role, e.g., based on the policy of the audio source or audio sink device. For example, the role assumed by the audio source may be dependent on decisions of initiating the link, initiating a role switch, and accepting/rejecting of a role switch request.

In one example, a role assignment may be dictated once during initial link setup, e.g., when there is still no knowledge of a future use of the link as an active audio link.

For example, the technical problem of role assignment may be exacerbated in case the audio sink, for example, a terminal device, e.g., a headset, is simultaneously connected to several different audio sources, for example, a PC and a mobile phone. In such a case, there may be many different combinations of central-peripheral assignments of the audio device vs. the audio source, which may be possible on the different links. This situation may cause potential interference and/or degraded behavior.

In some demonstrative aspects, it may not be enough to have a one-time request for role switch performed by a device, which is capable of being an audio source, e.g., PC or phone, during a link establishment with its peer, e.g., in case the device does not initiate the link and starts in peripheral role. In such case, the audio sink device may accept or reject the request.

For example, there is a need to provide a technical solution to support the audio source with a further dynamic policy to take the central role based, for example, on active use cases that the source device and/or the sink device may perform from time to time, e.g., as described below.

In one example, an audio sink, e.g., a Hands-Free device, may be connected to two devices, e.g., a PC and a phone, and/or any other BT devices. For example, at a given time. only one of these two devices may become the audio source. The behavior of the two devices as audio sources may be dynamic. For example, a first audio call may be set with a certain device at one time, e.g., a Voice over IP call with the PC, and a second audio call may be set with the second device at another time, e.g., a mobile call with the phone. This dynamic activation/deactivation of the active audio calls may result in a situation where the two audio sources act in the central mode. This situation may cause unsynchronized overlapping of communication transmissions, or may result in an audio source being in the peripheral role, e.g., if the headset rejects the role switch request from the audio source.

In some demonstrative aspects, there may be a need to address a technical issue when implementing a one-time link-establishment-time role switch policy by the audio sink device, e.g., the headset. For example, implementing the one-time link-establishment-time role switch policy by the audio sink device, e.g., the headset, may result in complexity for the audio source, e.g., the PC. For example, the complexity for the audio source may arise at multipoint scenarios, e.g., as a result of lack of bandwidth e.g., due to the audio source operating in the peripheral role on the link with the audio sink. This complexity at the audio source may lead to audio quality and/or HID latency issues, e.g., as described below.

Figure 2:
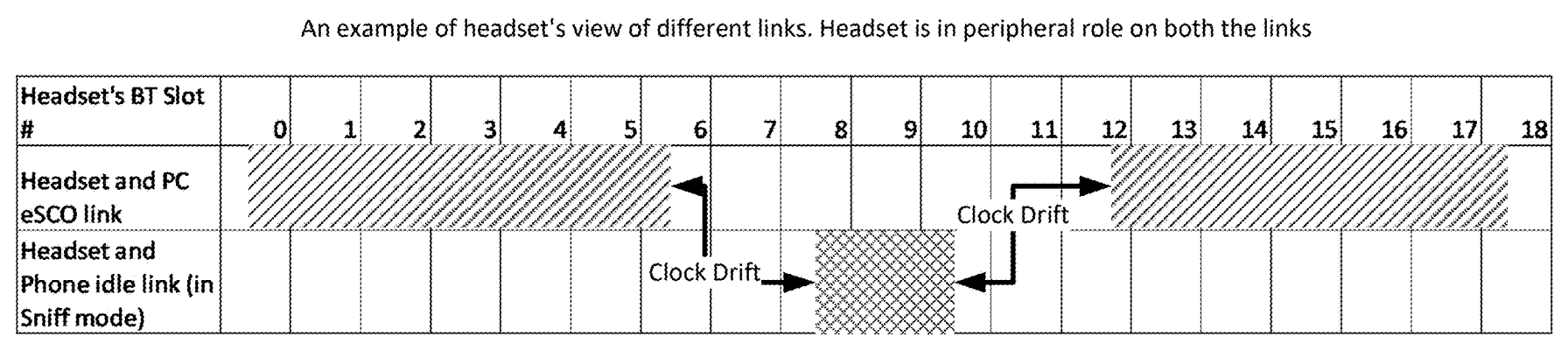

Reference is made to FIG. 2, which schematically illustrates an allocation of BT slots of a BT device communicating over two links, to illustrate a technical issue, which may be addressed in accordance with some demonstrative aspects.

For example, in one use case, a headset may be connected to a PC on a first BT link, and to a phone on a second BT link. For example, the headset may act in the peripheral role on both BT links.

For example, a user may have an active call on the PC, and may use the headset for the call audio. Accordingly, there may be an active eSCO link between the PC and the headset, e.g., along with an Asynchronous Connection-Less (ACL) link.

In one example, an eSCO configuration may result in 6 slots of activity every BT interval of 12 slots. It may be the case that all 6 slots are not used every time. For example, the 6 timeslots may be used in a noisy environment, when the devices are at a far distance, and./or at any other circumstances.

For example, the phone and the headset may have an idle link, for example, as long as there is no ongoing audio/call activities on the phone. In one example, the idle link may be maintained in a sniff mode. In one example, there may be some keep-alive kind communication over the idle link, for example, at a periodicity of hundreds of milliseconds (ms), e.g., a periodicity of ~200 ms, ~500 ms, 900 ms, or any other time period.

For example, as shown in FIG. 2, operating the headset in the role of the peripheral device over both BT links may result in a placement of links and allocation of bandwidth by the headset, which may follow the BT clock of the PC on the BT link with the PC, and may also follow the BT clock of the phone on the BT link with the phone.

For example, the BT link between the headset and the PC may use the BT clock of the PC, e.g., as the PC may be acting as the central device over the BT link with the headset. For example, the BT link between the headset and the PC may require a relatively high clock accuracy, e.g., a clock accuracy of +/−20 parts per million (ppm), for example, while the BT link between the headset and the PC is in an active mode.

For example, the BT link between the headset and the phone may use the BT clock of the phone, e.g., as the phone may be acting as the central device over the BT link with the headset. For example, the BT link between the headset and the phone may require a relatively low clock accuracy, e.g., a clock accuracy of +/−250 ppm, while the BT link between the headset and the phone is in a low power mode, e.g., the sniff mode.

For example, as shown in FIG. 2, the BT clock of the PC and the BT clock of the phone may drift independently. Accordingly, as shown in FIG. 2, there may be a possibility that activities of the two BT links will collide at some point in time. Such a collision may lead to degraded performance, for example, in terms of degraded audio quality over the BT link with the PC, and/or in terms of link drops over the BT link with the phone.

One possible solution to avoid the collision between the two BT links may be to have the headset take the central role on the link with the PC, and/or to have the headset take the central role on the link with the phone. For example, according to this solution, the BT clock of the headset may be used on the link where the headset acts in the central role. For example, the headset may "drag" the relevant link timing earlier or later, for example, by taking advantage of allowed timing jitter on the link. This solution may avoid collision of activities of the two links.

However, this possible solution may cause another technical problem, for example, in case the headset is not configured to implement a dynamic use-case-based role switch policy.

For example, an implementation in which the headset only tries to take the central role at a link establishment time, e.g., by performing a one-time role switch, may result in audio quality issues and/or HID latency issues, for example, due to a complexity caused at the PC side, e.g., as described below.

In one example, having the BT link between the PC and the headset use the BT clock of the headset may possibly result in increased bandwidth usage on the PC side. For example, the eSCO on the side of the PC may use 8 slots, e.g., 4 slot pairs, for example, instead of 6 slots, e.g., 3 slot pairs, every interval of 12 slots.

For example, this increased bandwidth usage on the PC side may cause a technical problem in a scenario where the PC is acting as a multipoint device. In one example, the PC may act as a multipoint device, which may be connected to one or more HIDs, e.g., a mouse and/or a keyboard.

For example, the PC may be required to allocate at least 6 slots within the 12-slot interval to the mouse and the keyboard. According to this example, the PC may need a total of 14 slots, e.g., including the 8 eSCO slots, and the 6 HID slots, every 12-slot interval. This requirement for 14 slots every 12-slot interval may result in a temporary overlap between the HID links and the eSCO link.

For example, the PC may "drag" the clock for the HID links to eventually address the wastage of bandwidth and resulting overlap. However, a procedure for clock dragging may be relatively slow, and a user may notice audio quality or HID latency issues, e.g., until the overlap is fixed.

In some cases, there may be a need to address another technical problem when having the headset take the central role on the link with the PC and/or the central role on the link with the phone.

For example, the headset may not always take the central role on the BT link with the PC.

In one example, if a multipoint headset in a particular scenario is not connected to the phone, and is only connected to PC, then the headset may not have much "motivation" to take the central role on the link with the PC. Accordingly, from time to time, or from user to user, the PC may be in central or peripheral role on the link with the headset, e.g., randomly. As a result, the PC and/or headset may have to optimize their link quality algorithms, e.g., AFH, Channel Classification, Transmit Power Control, and the like, for example, for considering their operation in both the central and peripheral roles.

Referring back to FIG. 1, in some demonstrative aspects, devices 102, 140, 160 and/or 180 may be configured to utilize a role-switching mechanism, which may be configured to support, e.g., ensure, dynamic role assignment based on one or more criteria, e.g., as described below.

In some demonstrative aspects, devices 102, 140, 160 and/or 180 may be configured to utilize a role-switching mechanism, which may be configured to support, e.g., ensure, dynamic role assignment based on a selected use-case, e.g., as described below.

In some demonstrative aspects, devices 102, 140, 160 and/or 180 may be configured to utilize a role-switching mechanism, which may be configured to support, e.g., ensure, that an audio source of an active audio link over a BT link always assumes the central role over this BT link, e.g., as described below.

In some demonstrative aspects, configuring the role-switching mechanism to ensure that the audio source always assumes the central role over the BT link may provide a technical solution to support improved, e.g., optimal, user experience.

In some demonstrative aspects, devices 102, 140, 160 and/or 180 may be configured to utilize a dynamic role-switching mechanism, which may be configured to support, e.g., ensure, that an audio source device is at the central role, for example, when an audio call is set up, e.g., as described below.

In some demonstrative aspects, the dynamic role-switching mechanism may be configured to support a technical solution for the audio source device to allow its peer device on the BT link to act in the role of the central device, for example, at times when there is no active audio call over the BT link, e.g., as described below.

In some demonstrative aspects, allowing the peer device to act in the role of the central device may provide a technical solution to enable better coordination with other audio sources, which may result in improved, e.g., optimized, over-all user experience, e.g., as described below.

In some demonstrative aspects, devices 102, 140, 160 and/or 180 may be configured to utilize a role-switching mechanism, which may support an optional implementation of the role switch initiation at a host processor of the BT device, e.g., as described below.

In some demonstrative aspects, devices 102, 140, 160 and/or 180 may be configured to utilize a role-switching mechanism, which may support an optional offload of the role switch initiation to a BT controller of the BT device, e.g., as described below.

In some demonstrative aspects, devices 102, 140, 160 and/or 180 may be configured to utilize a dynamic role-switching mechanism, which may be configured to support a dynamic role switch of audio-source devices, for example, such that an active audio gateway device in an audio call, e.g., an eSCO link, may assume, e.g., may always assume, the central role in the BT link, e.g., as described below.

In some demonstrative aspects, the audio source device may be configured to allow a role switch in response to a role switch request from a peer device of the BT link, for example, when the BT link is not having an active call.

In some demonstrative aspects, based on acceptance of the role switch request by the audio source, the peer device may be allowed switch to the role of the central device, for example, to improve, e.g., optimize, an overall experience for the user, e.g., as described below.

In some demonstrative aspects, controller 154 may be configured to cause, trigger, instruct and/or control device 140 to allow BT device 140 to operate in a role of a peripheral device over a BT link between BT device 140 and BT device 102, e.g., as described below.

In some demonstrative aspects, controller 154 may be configured to cause, trigger, instruct and/or control device 140 to allow the BT device 140 to operate in the role of the peripheral device over the BT link between the BT device 140 and the BT device 102, for example, upon establishment of the BT link between the BT device 140 and the BT device 102, e.g., as described below.

In other aspects, controller 154 may be configured to cause, trigger, instruct and/or control device 140 to allow the BT device 140 to operate in the role of the peripheral device over the BT link between the BT device 140 and the BT device 102, for example, post establishment of the BT link between the BT device 140 and the BT device 102, and/or at any other time.

In some demonstrative aspects, controller 154 may be configured to cause, trigger, instruct and/or control device 140 to initiate a role switch to switch the BT device 140 from the role of the peripheral device to a role of a central device over the BT link between the BT device 140 and the BT device 102, for example, based on a determination that the BT link between the BT device 140 and the BT device 102 is to be operated as an audio link to communicate audio data between the BT device 140, as an audio source, and the BT device 102, as an audio sink, e.g., as described below.

In some demonstrative aspects, the role of the central device over the BT link may include control of at least one of allocation of transmission timeslots over the BT link, or AFH channel selection for the BT link.

In other aspects, the role of the central device over the BT link may include control of one or more additional or alternative functionalities and/or mechanisms.

In some demonstrative aspects, controller 154 may be configured to cause, trigger, instruct and/or control device 140 to transmit to the BT device 102 a role switch request to initiate the role switch.

In some demonstrative aspects, the audio link may include an eSCO link.

In some demonstrative aspects, the audio link may include an eSCO link in a Hands-Free-Profile (HFP).

In other aspects, the audio link may be configured as any other type of audio link.

In some demonstrative aspects, controller 154 may be configured to cause, trigger, instruct and/or control device 140 to dynamically switch between the role of the central device and the role of a peripheral device over the BT link, for example, based on activation or deactivation of the audio link, e.g., as described below.

In some demonstrative aspects, controller 154 may be configured to cause, trigger, instruct and/or control device 140 to maintain the role of the central device over the BT link between the BT device 140 and the BT device 102, for example, as long as the BT link between the BT device 140 and the BT device 102 is operated as an active audio link, e.g., as described below.

For example, the controller 154 may be configured to cause, trigger, instruct and/or control device 140 to reject a role switch request from the BT device 102, for example, when the BT device 140 is acting as the central device of the BT link with BT device 102, and while the audio link is active over the BT link with BT device 102.

In some demonstrative aspects, controller 154 may be configured to cause, trigger, instruct and/or control device 140 to allow the BT device 140 to perform another role switch, for example, based on a determination that the audio link is not active, e.g., as described below.

In some demonstrative aspects, controller 154 may be configured to cause, trigger, instruct and/or control device 140 to, based on a determination that the audio link is not active, allow the BT device 140 to switch the BT device 140 from the role of the central device to the role of the peripheral device over the BT link between the BT device 140 and the BT device 102, e.g., as described below.

For example, the controller 154 may be configured to cause, trigger, instruct and/or control device 140 to accept and/or approve a role switch request from the BT device 102, for example, when the audio link is not active and the BT device 140 is acting as the central device of the BT link with BT device 102.

In some demonstrative aspects, controller 154 may be configured to cause, trigger, instruct and/or control device 140 to allow the BT device 140 to operate in the role of the peripheral device over the BT link between the BT device 140 and the BT device 102, for example, as long as the BT link between the BT device 140 and the BT 102 device is not operated as an active audio link, e.g., as described below.

In some demonstrative aspects, controller 154 may be configured to cause, trigger, instruct and/or control device 140 to allow the BT device 140 to operate in the role of the central device over another BT link between the BT device 140 and another BT device, e.g., BT device 180, for example, after switching the BT device 140 to the role of the central device over the BT link between the BT device 140 and the BT device 102, e.g., as described below.

In some demonstrative aspects, controller 154 may be configured to cause, trigger, instruct and/or control device 140 to restrict the BT device 140 to operate in the role of the central device over another BT link with the other BT device, e.g., device 180, for example, as long as the audio link is active, e.g., as described below.

For example, the controller 154 may be configured to cause, trigger, instruct and/or control device 140 to reject a role switch request from the BT device 180, for example, when the BT device 140 is acting as the central device of the BT link with BT device 180, and while the audio link is active over the BT link with BT device 102.

In some demonstrative aspects, controller 154 may be configured to include and/or perform one or more functionalities and/or operations of a BT controller 155 of the BT device 140.

In some demonstrative aspects, BT controller 155 may be configured to initiate the role switch to switch the BT device 140 from the role of the peripheral device to the role of the central device over the BT link between the BT device 140 and the BT device 102, for example, based on receipt of a call setup command 143 from a host processor 141 of the BT device 140, e.g., as described below.

In some demonstrative aspects, the call setup command 143 may be configured to request to setup an audio call over the BT link between the BT device 140 and the BT device 102, e.g., as described below.

In some demonstrative aspects, controller 124 may be configured to cause, trigger, instruct and/or control BT device 102 to allow the BT device 102 to operate in the role of the peripheral device over a first BT link between the BT device 102 and BT device 160, e.g., as described below.

In some demonstrative aspects, controller 124 may be configured to cause, trigger, instruct and/or control BT device 102 to allow the BT device 102 to operate in the role of the peripheral device over the first BT link, for example, upon establishment of the first BT link, e.g., as described below.

In other aspects, controller 124 may be configured to cause, trigger, instruct and/or control device 102 to allow the BT device 102 to operate in the role of the peripheral device over the BT link between the BT device 102 and the BT device 160, for example, post establishment of the BT link between the BT device 102 and the BT device 160, and/or at any other time.

In some demonstrative aspects, controller 124 may be configured to cause, trigger, instruct and/or control BT device 102 to initiate a role switch to switch the BT device 102 from the role of the peripheral device to a role of a central device over the first BT link, for example, based on a determination that the BT device 102 is to operate in the role of the peripheral device over a second BT link between BT device 102 and another BT device, e.g., BT device 140, as described below.

In some demonstrative aspects, the second BT link may include an audio link to communicate audio data between the other BT device, e.g., BT device 140, as an audio source, and the BT device 102, as an audio sink.

In some demonstrative aspects, the role of the central device over the first BT link may include control of at least one of allocation of transmission timeslots over the first BT link, or AFH channel selection for the first BT link.

In other aspects, the role of the central device over the first BT link may include control of one or more additional or alternative functionalities and/or mechanisms.

In some demonstrative aspects, controller 124 may be configured to cause, trigger, instruct and/or control BT device 102 to transmit to the BT device 160 a role switch request to initiate the role switch.

In some demonstrative aspects, the audio link may include an eSCO link.

In some demonstrative aspects, the audio link may include an eSCO link in an HFP.

In other aspects, the audio link may be configured as any other type of audio link.

In some demonstrative aspects, controller 124 may be configured to cause, trigger, instruct and/or control BT device 102 to dynamically switch between the role of the central device and the role of a peripheral device over the first BT link, for example, based on activation or deactivation of the audio link over the second BT link, e.g., as described below.

In some demonstrative aspects, controller 124 may be configured to cause, trigger, instruct and/or control BT device 102 to maintain the role of the central device over the first BT link, for example, as long as the second BT link is operated as an active audio link, e.g., as described below.

For example, the controller 124 may be configured to cause, trigger, instruct and/or control device 102 to reject a role switch request from the BT device 180, for example, when the BT device 102 is acting as the central device of the BT link with BT device 180, and while the audio link is active over the BT link with BT device 140.

In some demonstrative aspects, controller 124 may be configured to cause, trigger, instruct and/or control BT device 102 to initiate another role switch to switch the BT device 102 from the role of the peripheral device to the role of the central device over the second BT link, e.g., as described below.

In some demonstrative aspects, controller 124 may be configured to cause, trigger, instruct and/or control BT device 102 to initiate the other role switch to switch the BT device 102 from the role of the peripheral device to the role of the central device over the second BT link, for example, based on a determination that the first BT link is to be operated as another audio link to communicate audio data between the BT device 102, as the audio sink, and the BT device 160, as the audio source, e.g., as described below.

In some demonstrative aspects, controller 124 may be configured to cause, trigger, instruct and/or control BT device 102 to allow the BT device 102 to initiate another role switch to switch the BT device 102 from the role of the peripheral device to the role of the central device over the second BT link, for example, based on a determination that the audio link on the second BT link is not active, e.g., as described below.

For example, the controller 124 may be configured to cause, trigger, instruct and/or control BT device 102 to transmit to the BT device 140 a role switch request to request to switch the role of the BT device 102 to the role of the central device over the BT link between BT device 102 and BT device 140, for example, based on the determination that the audio link on the second BT link is not active and/or that the audio link over the BT link between BT device 102 and BT device 160 is to be active.

In some demonstrative aspects, controller 124 may be configured to cause, trigger, instruct and/or control BT device 102 to allow the BT device 102 to operate in the role of the central device over the second BT link, for example, as long as the second BT link is not used as an active audio link, e.g., as described below.

In some demonstrative aspects, controller 124 may be configured to include and/or perform one or more operations of, and/or functionalities of, a BT controller of the BT device 102, e.g., as described below.

In some demonstrative aspects, controller 124 may be configured to cause the BT controller of the BT device 102 to initiate the role switch, for example, based on receipt of a request from the BT device 140 to setup an audio call over the second BT link, e.g., as described below.

Figure 3:
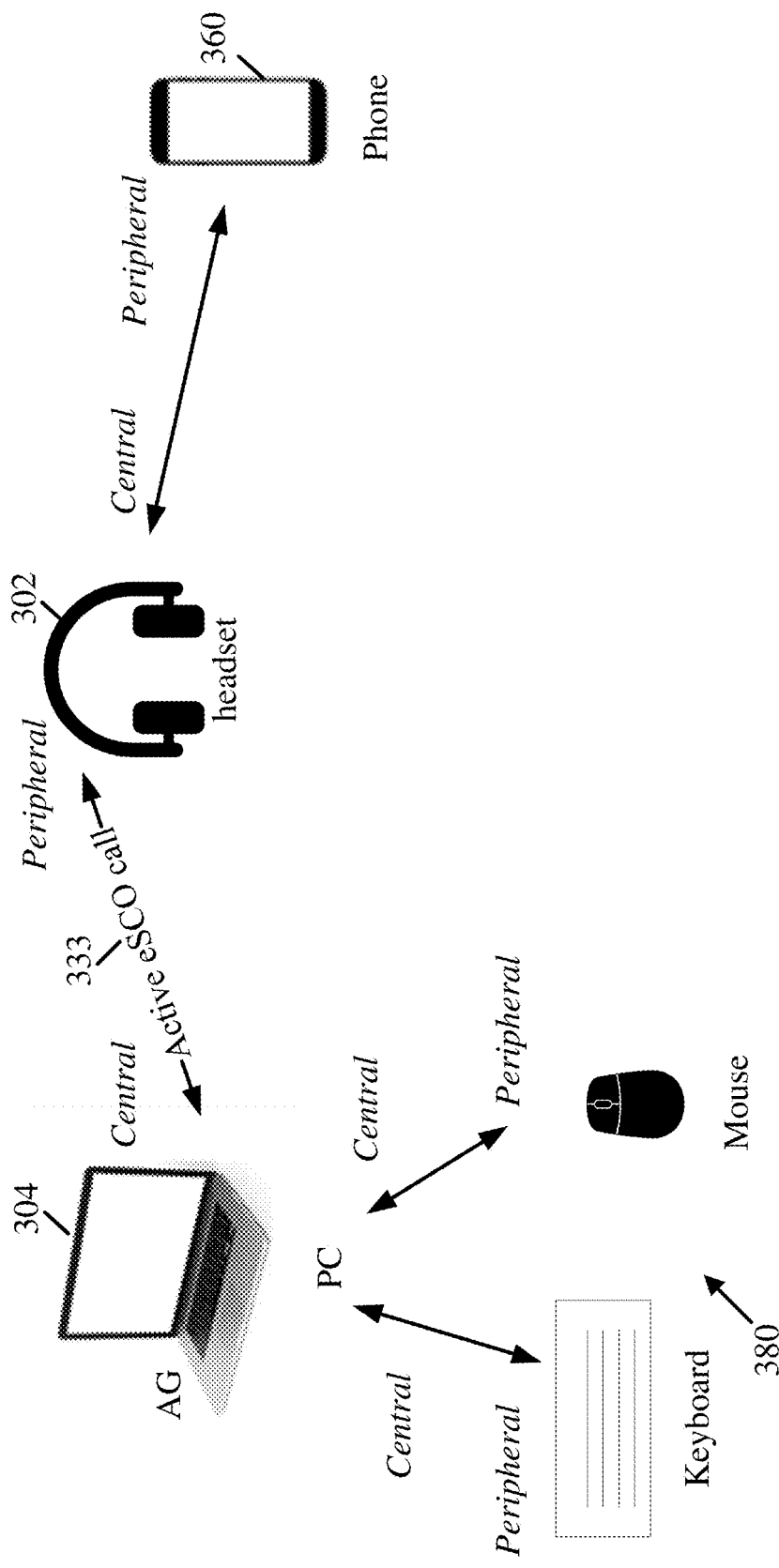
FIG. 3 is a schematic illustration of a first role assignment of a plurality of BT devices, in accordance with some demonstrative aspects.

Reference is made to FIG. 3, which schematically illustrates a first role assignment of a plurality of BT devices, in accordance with some demonstrative aspects.

In some demonstrative aspects, as shown in FIG. 3, a headset 302 may be connected by a first BT link to a PC 304, and by a second BT link to a phone 360. In one example, BT device 102 (FIG. 1) may operate as, and/or perform one or more operations and/or functionalities of, the headset 302. In one example, BT device 140 (FIG. 1) may operate as, and/or perform one or more operations and/or functionalities of, the PC 304. In one example, BT device 160 (FIG. 1) may operate as, and/or perform one or more operations and/or functionalities of, the phone 360.

In some demonstrative aspects, as shown in FIG. 3, the PC 304 may act in a central device role, for example, over one or more other BT links, for example, with one or more HID devices 380, e.g., a mouse and/or a keyboard. In one example, BT device 180 (FIG. 1. May operate as, and/or perform one or more operations and/or functionalities of, an HID device 380.

In some demonstrative aspects, as shown in FIG. 3, the PC 304 may assume a role of a central device over the first BT link between PC 304 and headset 302, for example, before an active audio call 333 is set from the PC 304.

In some demonstrative aspects, setting the PC 304 to assume the role of the central device over the first BT link between PC 304 and headset 302, for example, based on a determination that the active audio call 333 is to be set, may provide a technical solution to support improved, e.g., optimized, synchronization and/or frequency hopping of the PC 304 among its 3 connected devices, e.g., the headset 302, and the two HIDs 380.

In some demonstrative aspects, in some use, cases, deployments, scenarios, and/or implementations, synchronization and/or frequency hopping of the PC 304 among its 3 connected devices may be important, for example, to avoid interference and glitches, e.g., since the audio call may be air-resource intensive.

In some demonstrative aspects, as shown in FIG. 3, the headset 302 may assume a central role in its link with the phone 360, for example, depending on a policy of the phone 360.

In some demonstrative aspects, the headset 302 may adjust its timing, for example, in accordance with constraints dictated by the PC-headset link between PC 304 and headset 302.

In some demonstrative aspects, the headset 302 may be configured to dynamically switch between the roles of the peripheral device and the central device, e.g., for communication over the BT link between headset 302 and PC 304, and/or for communication over the BT link between headset 302 and phone 360, e.g., as escribed below.

In some demonstrative aspects, the headset 302 may be configured to dynamically switch between the roles of the peripheral device and the central device, for example, based on activation and/or de-activation of an audio call over the BT link between headset 302 and PC 304, and/or based on activation and/or de-activation of an audio call over the BT link between headset 302 and phone 360, e.g., as described below.

Figure 4:
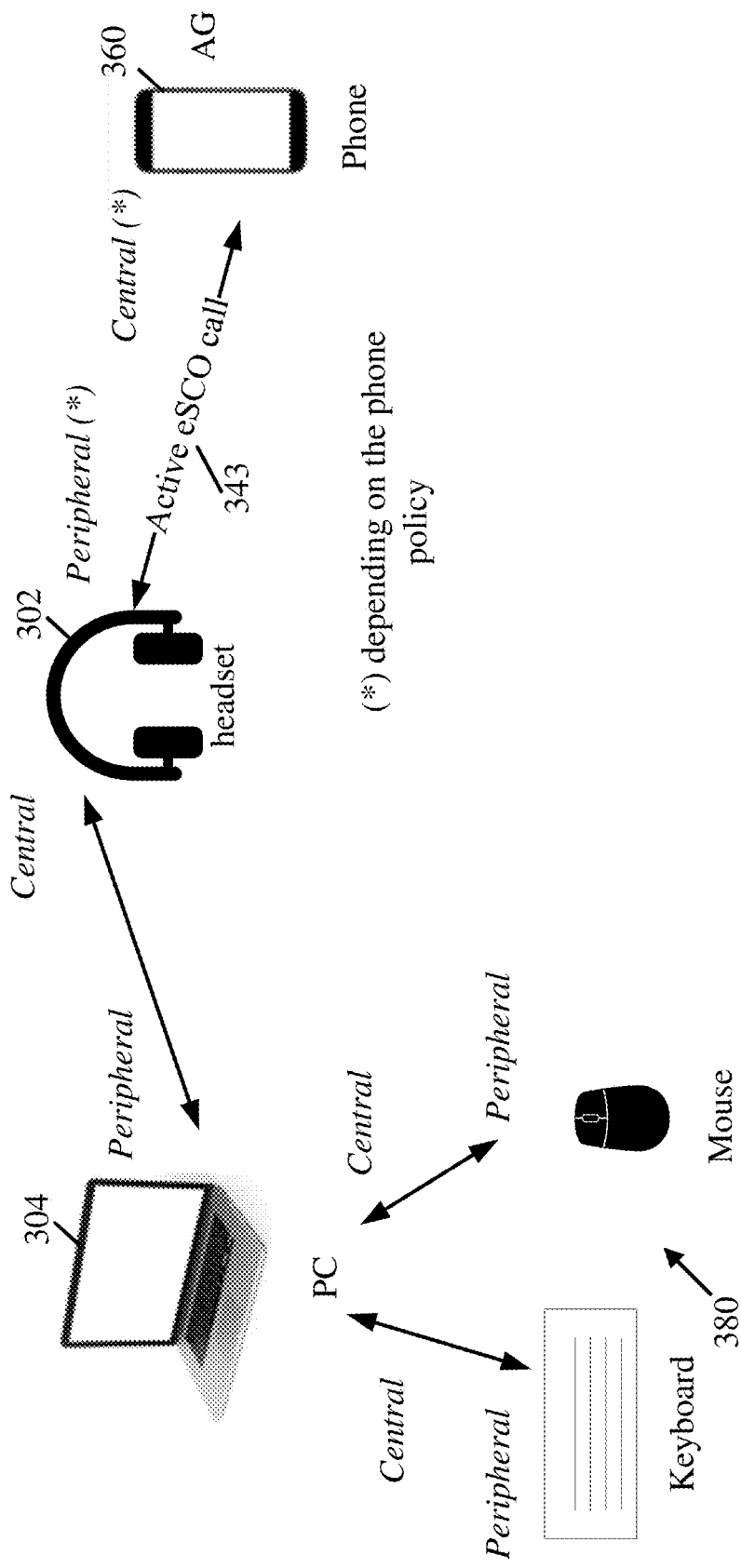
FIG. 4 is a schematic illustration of a second role assignment of the plurality of BT devices of FIG. 3, in accordance with some demonstrative aspects.

Reference is also made to FIG. 4, which schematically illustrates a second role assignment of the plurality of BT devices of FIG. 3, in accordance with some demonstrative aspects.

In some demonstrative aspects, as shown in FIG. 4, a topology of the devices of FIG. 3 may be switched, for example, upon setting up of an audio call 343 between the headset 302 and the phone 360.

In some demonstrative aspects, a topology of the devices of FIG. 3 may be switched, for example, to a topology configured to support improvement, e.g., optimizing, of the performance of the phone audio call between headset 302 and phone 360.

In some demonstrative aspects, as shown in FIG. 4, the headset 302 may initiate a request to become the central device in the link between headset 302 and the PC 304, for example, based on a determination that the audio call 343 is to be set up between the headset 302 and the phone 360.

In some demonstrative aspects, as shown in FIG. 4, the headset 302 may allow the phone 360 to act in the role of the central device, for example, if requested by the phone 360, e.g., based on a policy of the phone 360.

In some demonstrative aspects, the headset 302 may operate in either the central device role (mode) or the peripheral device role (mode) with respect to the phone 360.

In some demonstrative aspects, the headset 302, while acting in the role of the central device role over the BT link between the headset 302 and the PC 304, may have control, e.g., full control, for example, to co-ordinate the BT link with the PC 304.

In some demonstrative aspects, there may be a situation in which the PC 304 and the phone 360 may both have active audio calls, e.g., an active call on PC 304 and an incoming call on the phone 360. However, this situation may be a transient condition, for example, assuming that a user of the headset 302 will either end-up terminating one of the calls or putting one of the calls on hold. In both cases, one of the underlying eSCO 333 and eSCO 343 will be terminated or put on hold, and the scenario will become similar to a single eSCO scenario.

In some demonstrative aspects, the PC 304, the headset 302 and/or the phone 360 may be configured to perform one or more role switches in a dynamic manner, for example, based on the use case, e.g., as described below.

In some demonstrative aspects, the PC 304 may be configured to initiate a role switch to obtain a central device role on the BT link between PC 304 and the headset 302, for example, whenever the PC 304 needs to establish an eSCO 333 for an incoming call or an active call over the BT link between PC 304 and the headset 302.

For example, PC 304 may be configured to initiate the role switch to obtain the central device role on the link, for example, before establishing an eSCO.

In some demonstrative aspects, the phone 360 may be configured to initiate a role switch to obtain a central device role on the BT link between phone 360 and the headset 302, for example, whenever the phone 360 needs to establish an eSCO 343 for an incoming call or an active call over the BT link between phone 360 and the headset 302.

For example, phone 360 may be configured to initiate the role switch to obtain the central device role on the link, for example, before establishing an eSCO.

In some demonstrative aspects, the headset 302 may be configured to initiate a role switch with another device, which does not have an active call going on, for example, based on a determination that the headset 302 is acting in the peripheral device role, for example, over a BT link with a device which has an active eSCO for an active or incoming call.

For example, the headset 302 may be configured to initiate a role switch with the PC 304, for example, based on a determination that there is no active call going on over the BT link between the headset 302 and the PC 304, while the headset 302 is acting in the peripheral device role, for example, over the BT link with the phone 360, which has the active eSCO 343 for an active or incoming call.

In some demonstrative aspects, a dynamic role-switching mechanism, which is configured to initiate one or more role switches in a dynamic manner, for example, based on the use case, e.g., as described above, may provide a technical solution to provide improved, or even optimal, performance of audio links over BT links, e.g., as described below.

In some demonstrative aspects, a dynamic role-switching mechanism, which is configured to initiate one or more role switches in a dynamic manner, for example, based on the use case, e.g., as described above, may provide a technical solution to provide improved, or even optimal, user experience, e.g., a described below.

In some demonstrative aspects, a dynamic role-switching mechanism, which allows the headset 302 to assume the central role on the idle link between headset 302 and PC 304, may be implemented to provide a technical solution for the headset 302 to be able to "drag" the BT link with PC 304 "left" or "right", for example, to avoid collision with the eSCO link 343.

In some demonstrative aspects, a dynamic role-switching mechanism, which ensures that the audio source of an audio link, e.g., the PC, acts in the central role on link with headset 302 during the active call 333, may be implemented to provide a technical solution for the PC 304 to control the link placement per the BT clock of the PC 304. Accordingly, this implementation may provide a technical solution to mitigate bandwidth wastage of the bandwidth of the PC 304, for example, by avoiding a situation of temporary overlap between HID links of HIDs 380 and eSCO links, e.g., link 333. Therefore, this implementation may provide a technical solution to mitigate HID and/or audio quality issues.

In some demonstrative aspects, the dynamic role-switching mechanism, e.g., as described above, may ensure that the PC 304 and the phone 360 may each assume the central role on the BT link with the headset 302, for example, as soon as there is an active call, e.g., as soon as the link 333 or the link 343 is active. Accordingly, the PC 304 and/or the phone 360 may be required to optimize their audio link quality algorithms, for example, only for the central role. For example, the headset 302 may be required to optimize its own audio link quality algorithms, for example, only for the peripheral role. As a result, the chances of achieving good audio quality may be improved significantly, for example, as a number of combinations for optimization may be reduced. These optimizations may be performed, for example, for varying interference profiles and/or varying ranges. Accordingly, reducing the number of combinations may be an important factor to ensure good user experience.

Referring back to FIG. 1, in some demonstrative aspects, devices 102, 140 160 and/or 180 may be configured to implement the dynamic role-switching mechanism to support dynamic use-case dependent behavior, for example, using a role switch procedure, e.g., in accordance with a Bluetooth standard. For example, a task of initiating the role switch, e.g., before setting up an audio call, may be implemented by a Bluetooth host of a BT device, e.g., host processor 141 of BT device 140. For example, a Bluetooth controller of the BT device, e.g., BT controller 155 of BT device 140, may be configured to accept and/or process requests to switch to peripheral roles by a peer, for example, when not in active audio call.

In some demonstrative aspects, initiation of the role switch may be offloaded to the Bluetooth controller of the BT device, e.g., BT controller 155 of BT device 140, e.g., as described below.

In some demonstrative aspects, BT controller 155 may be configured to implement a controller-initiated role switch. For example, the role switch may be defined to be fully a controller task, for example, while the host, e.g., host processor 141, may not be required to perform the role switch.

In some demonstrative aspects, some or all host functionalities may be implemented by an Operating System (OS) of the BT device. Accordingly, the controller-initiated role switch may be implemented to provide a technical solution to relieve a dependency of the role switch on OS functionality. For example, the controller-initiated role switch may be implemented to provide a technical solution to support a smooth OS-Independent generic approach.

In some demonstrative aspects, BT controller 155 may be configured to identify an audio call by the host processor 141. For example, based on the audio call, the BT controller 155 may perform a role switch, e.g., to switch the BT device 140 to the role of the central device over a BT link to be used for the audio call.

In some demonstrative aspects, the BT controller 155 may be configured to proceed with eSCO setup of the eSCO link over the BT link, for example, after switching to the role of the central device over a BT link.

In some demonstrative aspects, the BT controller 155 may be configured to notify the host processor 141 of the role switch, while the host may not be required to implement the functionality of the role switch.

Figure 5:
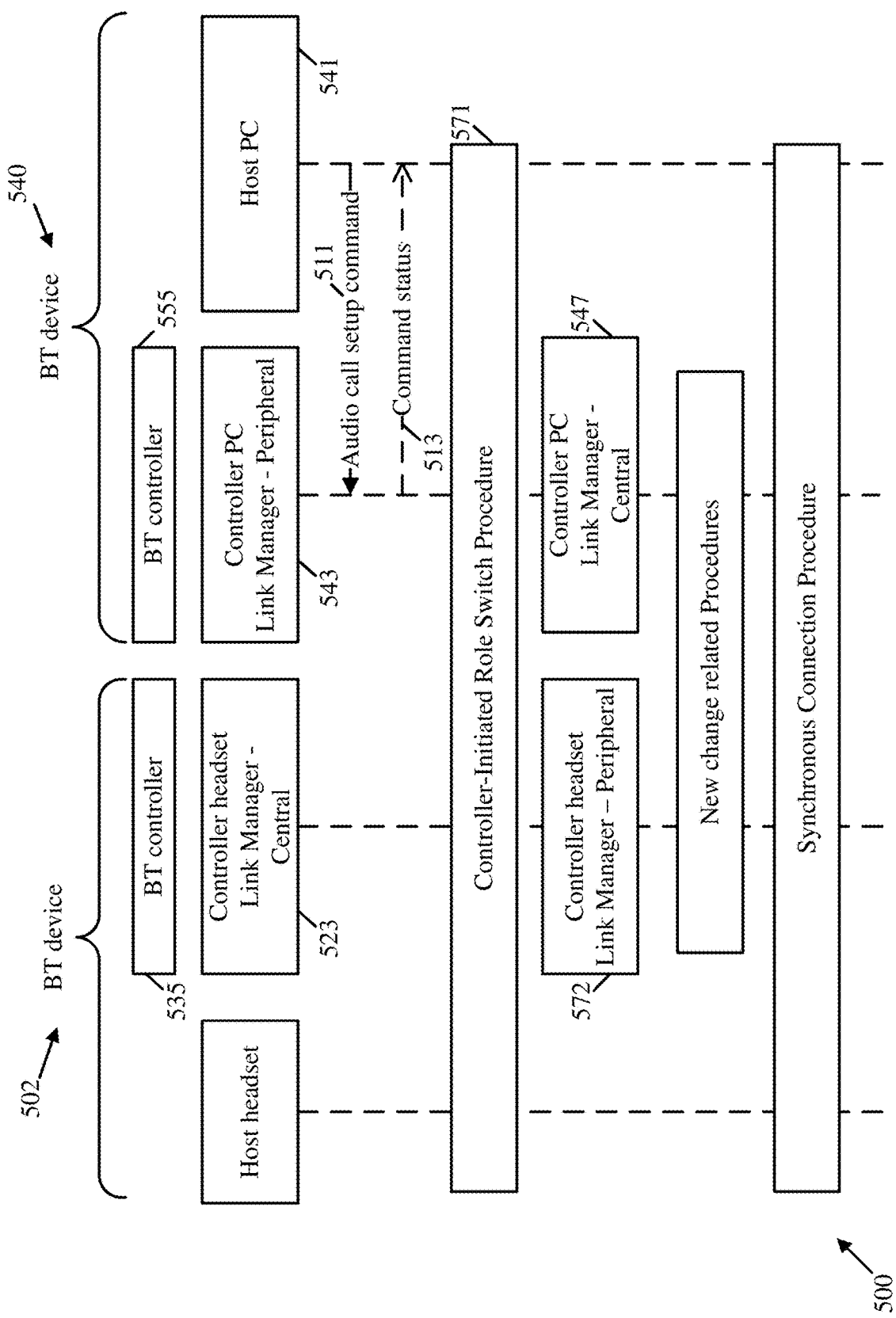
FIG. 5 is a schematic illustration of a role-switching scheme of BT role-switching between a first BT device and a second BT device, in accordance with some demonstrative aspects.

Reference is made to FIG. 5, which schematically illustrates a role-switching scheme 500 of BT role switching between a first BT device 540 and a second BT device 502, in accordance with some demonstrative aspects. In one example, BT device 140 (FIG. 1) may be configured to perform one or more operations and/or functionalities of BT device 540, and/or BT device 102 (FIG. 1) may be configured to perform one or more operations and/or functionalities of BT device 502.

In some demonstrative aspects, as shown in FIG. 5, a BT controller 555 of the BT device 540 may act in a role of a peripheral device 543 over a BT link between the BT device 540 and the BT device 502, and a BT controller 535 of the BT device 502 may act in a role of a central device 523 over the BT link between the BT device 540 and the BT device 502.

In some demonstrative aspects, as shown in FIG. 5, a host 541 of the BT device 540 may send an audio call setup command 511 to the BT controller 555. For example, the audio call setup command 511 may initiate an audio call setup for an audio call over a BT link between the BT device 540 and the BT device 502.

In some demonstrative aspects, as shown in FIG. 5, the BT controller 555 may send to the host 541 a command status 513, e.g., in response to the audio call setup command 511.

In one example, host processor 141 (FIG. 1) may be configured to perform one or more operations and/or functionalities of host 541, and/or BT controller 155 (FIG. 1) may be configured to perform one or more operations and/or functionalities of BT controller 555.

In some demonstrative aspects, as shown in FIG. 5, the BT controller 555 may be configured to initiate a role switch procedure 571 with the BT controller 535 of the BT device 502, for example, based on receipt of the audio call setup command 511 from host 541.

In some demonstrative aspects, as shown in FIG. 5, the BT controller 555 may initiate a role switch procedure 571 to switch roles with the BT controller 535, for example, such that BT controller 555 may act in the role of a central device 547 over the BT link between the BT device 540 and the BT device 502, and the BT controller 535 may act in the role of a peripheral device 572 over the BT link between the BT device 540 and the BT device 502.

Figure 6:
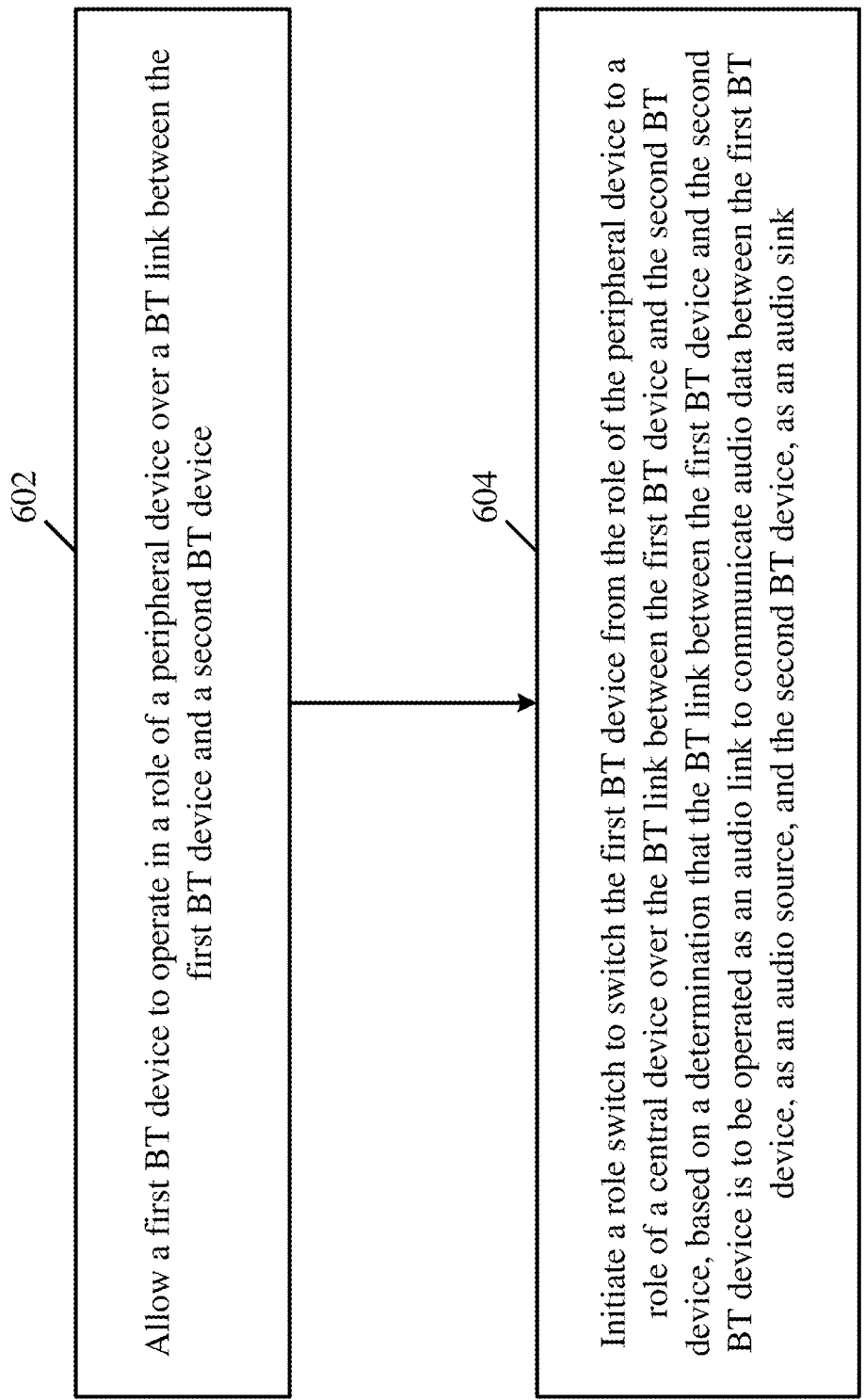
FIG. 6 is a schematic flow-chart illustration of a method of BT role switching, in accordance with some demonstrative aspects.

Reference is made to FIG. 6, which schematically illustrates a method of BT role switching, in accordance with some demonstrative aspects. For example, one or more of the operations of the method of FIG. 6 may be performed by one or more elements of a system, e.g., system 100 (FIG. 1), for example, a BT device, e.g., BT device 140 (FIG. 1), and/or a controller, e.g., controller 154 (FIG. 1).

As indicated at block 602, the method may include allowing a first BT device to operate in a role of a peripheral device over a BT link between the first BT device and a second BT device. For example, controller 154 (FIG. 1) may be configured to allow BT device 102 (FIG. 1) to operate in a role of a peripheral device over a BT link between the BT device 102 (FIG. 1) and BT device 140 (FIG. 1), e.g., as described above.

As indicated at block 604, the method may include initiating a role switch to switch the first BT device from the role of the peripheral device to a role of a central device over the BT link between the first BT device and the second BT device, for example, based on a determination that the BT link between the first BT device and the second BT device is to be operated as an audio link to communicate audio data between the first BT device, as an audio source, and the second BT device, as an audio sink. For example, controller 154 (FIG. 1) may be configured to initiate a role switch to switch the BT device 140 (FIG. 1) from the role of the peripheral device to a role of a central device over the BT link between the BT device 140 (FIG. 1) and the BT device 102 (FIG. 1), for example, based on a determination that the BT link between the BT device 140 (FIG. 1) and BT device 102 (FIG. 1) is to be operated as an audio link to communicate audio data between the BT device 140 (FIG. 1), as an audio source, and the BT device 102 (FIG. 1), as an audio sink, e.g., as described above.

Figure 7:
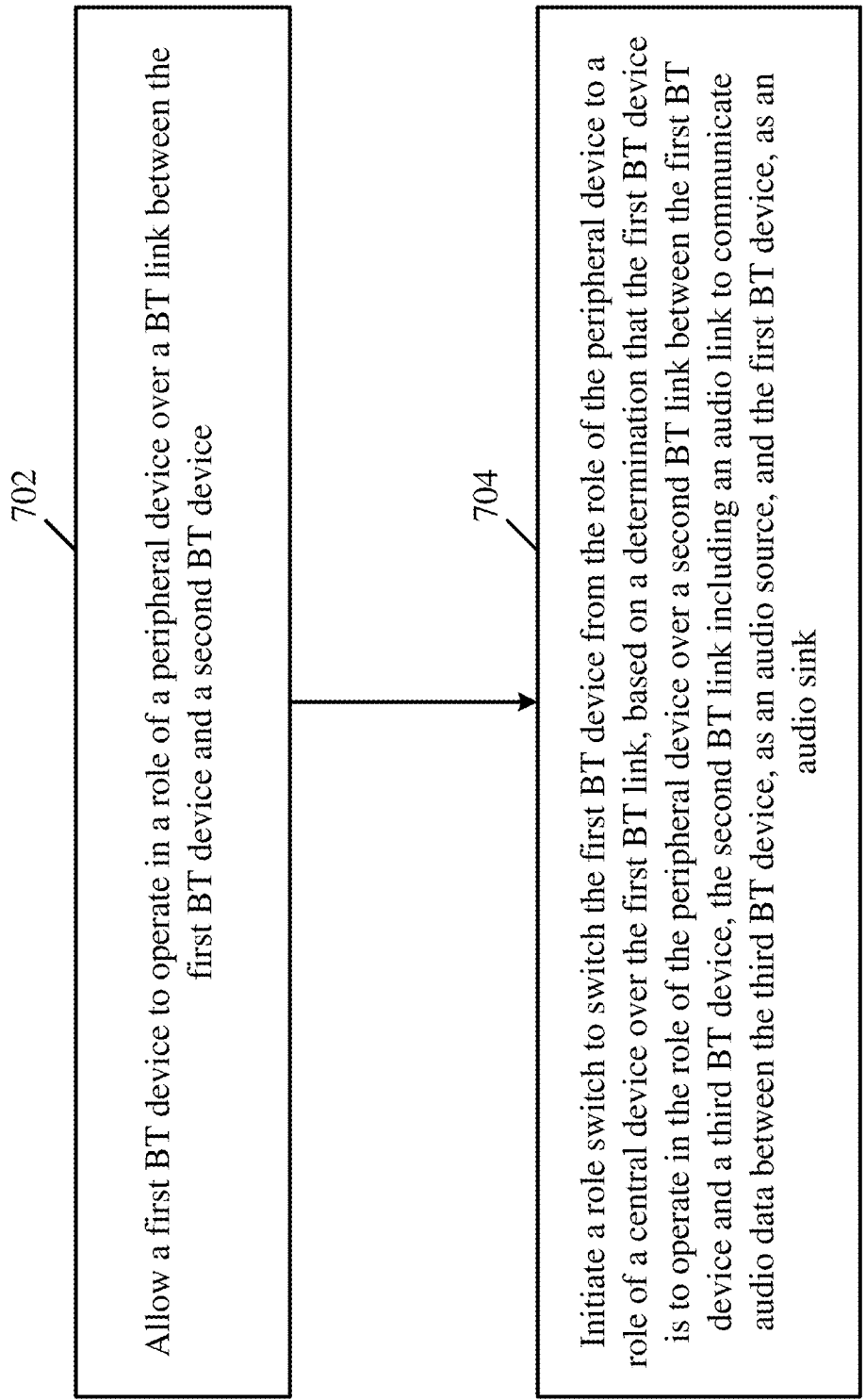
FIG. 7 is a schematic flow-chart illustration of a method of BT role switching, in accordance with some demonstrative aspects.

Reference is made to FIG. 7, which schematically illustrates a method of BT role switching, in accordance with some demonstrative aspects. For example, one or more of the operations of the method of FIG. 7 may be performed by one or more elements of a system, e.g., system 100 (FIG. 1), for example, a BT device, e.g., BT device 102 (FIG. 1), and/or a controller, e.g., controller 124 (FIG. 1).

As indicated at block 702, the method may include allowing a first BT device to operate in a role of a peripheral device over a BT link between the first BT device and a second BT device. For example, controller 124 (FIG. 1) may be configured to allow BT device 102 (FIG. 1) to operate in a role of a peripheral device over a BT link between the BT device 102 (FIG. 1) and BT device 160 (FIG. 1), e.g., as described above.

As indicated at block 704, the method may include initiating a role switch to switch the first BT device from the role of the peripheral device to a role of a central device over the first BT link, for example, based on a determination that the first BT device is to operate in the role of the peripheral device over a second BT link between the first BT device and a third BT device, the second BT link including, for example, an audio link to communicate audio data between the third BT device, as an audio source, and the first BT device, as an audio sink. For example, controller 124 (FIG. 1) may be configured to initiate a role switch to switch the BT device 102 (FIG. 1) from the role of the peripheral device to a role of a central device over the first BT link, for example, based on a determination that the BT device 102 (FIG. 1) is to operate in the role of the peripheral device over a second BT link between the BT device 102 (FIG. 1) and the BT device 140 (FIG. 1), for example, wherein the second BT link is to include an audio link to communicate audio data between the BT device 140 (FIG. 1), as an audio source, and the BT device 102 (FIG. 1), as an audio sink, e.g., as described above.

Figure 8:
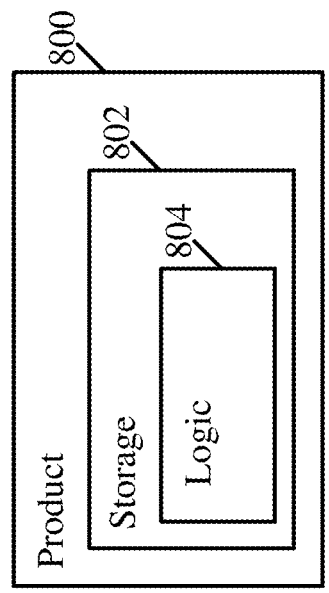
FIG. 8 is a schematic illustration of a product of manufacture, in accordance with some demonstrative aspects.

Reference is made to FIG. 8, which schematically illustrates a product of manufacture 800, in accordance with some demonstrative aspects. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), controller 124 (FIG. 1), message processor 128 (FIG. 1), device 140 (FIG. 1), controller 154 (FIG. 1), message processor 158 (FIG. 1), device 160, and/or device 180; to cause device 102 (FIG. 1), controller 124 (FIG. 1), message processor 128 (FIG. 1), device 140 (FIG. 1), controller 154 (FIG. 1), message processor 158 (FIG. 1), device 160, and/or device 180, to perform, trigger and/or implement one or more operations and/or functionalities; and/or to perform, trigger and/or implement one or more operations and/or functionalities described with reference to the FIGS. 1-7, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 800 and/or machine-readable storage media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a first Bluetooth (BT) device to allow the first BT device to operate in a role of a peripheral device over a BT link between the first BT device and a second BT device; and initiate a role switch to switch the first BT device from the role of the peripheral device to a role of a central device over the BT link between the first BT device and the second BT device, based on a determination that the BT link between the first BT device and the second BT device is to be operated as an audio link to communicate audio data between the first BT device, as an audio source, and the second BT device, as an audio sink.

Example 2 includes the subject matter of Example 1, and optionally, wherein the apparatus is configured to cause the first BT device to maintain the role of the central device over the BT link between the first BT device and the second BT device as long as the BT link between the first BT device and the second BT device is operated as an active audio link.

Example 3 includes the subject matter of Example 1 or 2, and optionally, wherein the apparatus is configured to allow the first BT device to, based on a determination that the audio link is not active, perform an other role switch to switch the first BT device from the role of the central device to the role of the peripheral device over the BT link between the first BT device and the second BT device.

Example 4 includes the subject matter of any one of Examples 1-3, and optionally, wherein the apparatus is configured to allow the first BT device to operate in the role of the peripheral device over the BT link between the first BT device and the second BT device as long as the BT link between the first BT device and the second BT device is not operated as an active audio link.

Example 5 includes the subject matter of any one of Examples 1-4, and optionally, wherein the apparatus is configured to allow the first BT device to operate in the role of the central device over an other BT link between the first BT device and a third BT device, after switching the first BT device to the role of the central device over the BT link between the first BT device and the second BT device.

Example 6 includes the subject matter of any one of Examples 1-5, and optionally, wherein the apparatus is configured to cause the first BT device to, as long as the audio link is active, restrict the first BT device to operate in the role of the central device over an other BT link with a third BT device.

Example 7 includes the subject matter of any one of Examples 1-6, and optionally, wherein the apparatus is configured allow the first BT device to operate in the role of the peripheral device over the BT link between the first BT device and the second BT device upon establishment of the BT link between the first BT device and the second BT device.

Example 8 includes the subject matter of any one of Examples 1-7, and optionally, wherein the apparatus is configured to cause the first BT device to dynamically switch between the role of the central device and the role of a peripheral device over the BT link based on activation or deactivation of the audio link.

Example 9 includes the subject matter of any one of Examples 1-8, and optionally, wherein the apparatus is configured cause the first BT device to transmit to the second BT device a role switch request to initiate the role switch.

Example 10 includes the subject matter of any one of Examples 1-9, and optionally, comprising a BT controller of the first BT device, the BT controller to initiate the role switch based on receipt of a call setup command from a host processor of the first BT device, the call setup command to request to setup an audio call over the BT link between the first BT device and the second BT device.

Example 11 includes the subject matter of any one of Examples 1-10, and optionally, wherein the role of the central device over the BT link comprises control of at least one of allocation of transmission timeslots over the BT link, or Adaptive Frequency Hoping (AFH) channel selection for the BT link.

Example 12 includes the subject matter of any one of Examples 1-11, and optionally, wherein the audio link comprises an Enhanced Synchronous Connection Oriented (eSCO) link.

Example 13 includes the subject matter of any one of Examples 1-12, and optionally, wherein the audio link comprises an Enhanced Synchronous Connection Oriented (eSCO) link in a Hands-Free-Profile (HFP).

Example 14 includes the subject matter of any one of Examples 1-13, and optionally, comprising a BT radio to communicate BT packets over the BT link.

Example 15 includes the subject matter of Example 14, and optionally, comprising one or more antennas connected to the radio, and a processor to execute instructions of an operating system of the first BT device.

Example 16 includes an apparatus comprising logic and circuitry configured to cause a first Bluetooth (BT) device to allow the first BT device to operate in a role of a peripheral device over a first BT link between the first BT device and a second BT device; and initiate a role switch to switch the first BT device from the role of the peripheral device to a role of a central device over the first BT link, based on a determination that the first BT device is to operate in the role of the peripheral device over a second BT link between the first BT device and a third BT device, the second BT link comprising an audio link to communicate audio data between the third BT device, as an audio source, and the first BT device, as an audio sink.

Example 17 includes the subject matter of Example 16, and optionally, wherein the apparatus is configured to cause the first BT device to maintain the role of the central device over the first BT link as long as the second BT link is operated as an active audio link.

Example 18 includes the subject matter of Example 16 or 17, and optionally, wherein the apparatus is configured to cause the first BT device to initiate an other role switch to switch the first BT device from the role of the peripheral device to the role of the central device over the second BT link, based on a determination that the first BT link is to be operated as an other audio link to communicate audio data between the first BT device, as the audio sink, and the second BT device, as the audio source.

Example 19 includes the subject matter of any one of Examples 16-18, and optionally, wherein the apparatus is configured to allow the first BT device to initiate an other role switch to switch the first BT device from the role of the peripheral device to the role of the central device over the second BT link, based on a determination that the audio link on the second BT link is not active.

Example 20 includes the subject matter of any one of Examples 16-19, and optionally, wherein the apparatus is configured to allow the first BT device to operate in the role of the central device over the second BT link as long as the second BT link is not used as an active audio link.

Example 21 includes the subject matter of any one of Examples 16-20, and optionally, wherein the apparatus is configured allow the first BT device to operate in the role of the peripheral device over the first BT link upon establishment of the first BT link.

Example 22 includes the subject matter of any one of Examples 16-21, and optionally, wherein the apparatus is configured to cause the first BT device to dynamically switch between the role of the central device and the role of a peripheral device over the first BT link based on activation or deactivation of the audio link over the second BT link.

Example 23 includes the subject matter of any one of Examples 16-22, and optionally, comprising a BT controller of the first BT device, the BT controller to initiate the role switch based on receipt of a request from the third BT device to setup an audio call over the second BT link.

Example 24 includes the subject matter of any one of Examples 16-23, and optionally, wherein the apparatus is configured cause the first BT device to transmit to the second BT device a role switch request to initiate the role switch.

Example 25 includes the subject matter of any one of Examples 16-24, and optionally, wherein the role of the central device over the first BT link comprises control of at least one of allocation of transmission timeslots over the first BT link, or Adaptive Frequency Hoping (AFH) channel selection for the first BT link.

Example 26 includes the subject matter of any one of Examples 16-25, and optionally, wherein the audio link comprises an Enhanced Synchronous Connection Oriented (eSCO) link.

Example 27 includes the subject matter of any one of Examples 16-26, and optionally, wherein the audio link comprises an Enhanced Synchronous Connection Oriented (eSCO) link in a Hands-Free-Profile (HFP).

Example 28 includes the subject matter of any one of Examples 16-27, and optionally, comprising a BT radio to communicate BT packets over the first BT link.

Example 29 includes the subject matter of Example 28, and optionally, comprising one or more antennas connected to the radio, and a processor to execute instructions of an operating system of the first BT device.

Example 30 comprises a wireless communication device comprising the apparatus of any one of Examples 1-29.

Example 31 comprises an apparatus comprising means for executing any of the described operations of Examples 1-29.

Example 32 comprises a product comprising one or more tangible computer-readable non-transitory storage media comprising computer-executable instructions operable to, when executed by at least one processor, enable the at least one processor to cause a device to perform any of the described operations of Examples 1-29.

Example 33 comprises an apparatus comprising: a memory interface; and processing circuitry configured to: perform any of the described operations of Examples 1-29.

Example 34 comprises a method comprising any of the described operations of Examples 1-29.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first Bluetooth (BT) device to:
   allow the first BT device to operate in a role of a peripheral device over a BT link between the first BT device and a second BT device;
   initiate a role switch to switch the first BT device from the role of the peripheral device to a role of a central device over the BT link between the first BT device and the second BT device, based on a determination that the BT link between the first BT device and the second BT device is to be operated as an audio link to communicate audio data between the first BT device, as an audio source, and the second BT device, as an audio sink;
   maintain the role of the central device over the BT link between the first BT device and the second BT device as long as the BT link between the first BT device and the second BT device is operated as an active audio link; and
   allow the first BT device to, based on a determination that the audio link is not active, perform another role switch to switch the first BT device from the role of the central device to the role of the peripheral device over the BT link between the first BT device and the second BT device.

2. The apparatus of claim 1, wherein the audio link comprises an Enhanced Synchronous Connection Oriented (eSCO) link in a Hands-Free-Profile (HFP).

3. The apparatus of claim 1 configured to allow the first BT device to operate in the role of the peripheral device over the BT link between the first BT device and the second BT device as long as the BT link between the first BT device and the second BT device is not operated as an active audio link.

4. The apparatus of claim 1 configured to allow the first BT device to operate in the role of the central device over an other BT link between the first BT device and a third BT device, after switching the first BT device to the role of the central device over the BT link between the first BT device and the second BT device.

5. The apparatus of claim 1 configured to cause the first BT device to, as long as the audio link is active, restrict the first BT device to operate in the role of the central device over an other BT link with a third BT device.

6. The apparatus of claim 1 configured to allow the first BT device to operate in the role of the peripheral device over the BT link between the first BT device and the second BT device upon establishment of the BT link between the first BT device and the second BT device.

7. The apparatus of claim 1 configured to cause the first BT device to dynamically switch between the role of the central device and the role of the peripheral device over the BT link based on activation or deactivation of the audio link.

8. The apparatus of claim 1 configured cause the first BT device to transmit to the second BT device a role switch request to initiate the role switch.

9. The apparatus of claim 1 comprising a BT controller of the first BT device, the BT controller to initiate the role switch based on receipt of a call setup command from a host processor of the first BT device, the call setup command to request to setup an audio call over the BT link between the first BT device and the second BT device.

10. The apparatus of claim 1, wherein the role of the central device over the BT link comprises control of at least one of allocation of transmission timeslots over the BT link, or Adaptive Frequency Hoping (AFH) channel selection for the BT link.

11. The apparatus of claim 1, wherein the audio link comprises an Enhanced Synchronous Connection Oriented (eSCO) link.

12. The apparatus of claim 1 comprising a BT radio to communicate BT packets over the BT link.

13. The apparatus of claim 12 comprising one or more antennas connected to the BT radio, and a processor to execute instructions of an operating system of the first BT device.

14. A product comprising one or more tangible computer-readable non-transitory storage media comprising computer-executable instructions operable to, when executed by at least one processor, enable the at least one processor to cause a first Bluetooth (BT) device to:
allow the first BT device to operate in a role of a peripheral device over a BT link between the first BT device and a second BT device;
initiate a role switch to switch the first BT device from the role of the peripheral device to a role of a central device over the BT link between the first BT device and the second BT device, based on a determination that the BT link between the first BT device and the second BT device is to be operated as an audio link to communicate audio data between the first BT device, as an audio source, and the second BT device, as an audio sink;
maintain the role of the central device over the BT link between the first BT device and the second BT device as long as the BT link between the first BT device and the second BT device is operated as an active audio link; and
allow the first BT device to, based on a determination that the audio link is not active, perform another role switch to switch the first BT device from the role of the central device to the role of the peripheral device over the BT link between the first BT device and the second BT device.

15. The product of claim 14, wherein the instructions, when executed, cause the first BT device to, as long as the audio link is active, restrict the first BT device to operate in the role of the central device over an other BT link with a third BT device.

16. An apparatus comprising logic and circuitry configured to cause a first Bluetooth (BT) device to:
allow the first BT device to operate in a role of a peripheral device over a first BT link between the first BT device and a second BT device;
initiate a role switch to switch the first BT device from the role of the peripheral device to a role of a central device over the first BT link, based on a determination that the first BT device is to operate in the role of the peripheral device over a second BT link between the first BT device and a third BT device, the second BT link comprising an audio link to communicate audio data between the third BT device, as an audio source, and the first BT device, as an audio sink; and
maintain the role of the central device over the first BT link as long as the second BT link is operated as an active audio link.

17. The apparatus of claim 16 configured to allow the first BT device to operate in the role of the central device over the second BT link as long as the second BT link is not used as the active audio link.

18. The apparatus of claim 16 configured to cause the first BT device to initiate an other role switch to switch the first BT device from the role of the peripheral device to the role of the central device over the second BT link, based on a determination that the first BT link is to be operated as an other audio link to communicate audio data between the first BT device, as the audio sink, and the second BT device, as the audio source.

19. The apparatus of claim 16 configured to allow the first BT device to initiate an other role switch to switch the first BT device from the role of the peripheral device to the role of the central device over the second BT link, based on a determination that the audio link on the second BT link is not active.

20. The apparatus of claim 16 configured to cause the first BT device to dynamically switch between the role of the central device and the role of the peripheral device over the first BT link based on activation or deactivation of the audio link over the second BT link.

21. The apparatus of claim 16 comprising a BT controller of the first BT device, the BT controller to initiate the role switch based on receipt of a request from the third BT device to setup an audio call over the second BT link.

22. The apparatus of claim 16 comprising a BT radio to communicate BT packets over the first BT link.

23. An apparatus for a first Bluetooth (BT) device, the apparatus comprising:
means for allowing the first BT device to operate in a role of a peripheral device over a first BT link between the first BT device and a second BT device;

means for initiating a role switch to switch the first BT device from the role of the peripheral device to a role of a central device over the first BT link, based on a determination that the first BT device is to operate in the role of the peripheral device over a second BT link between the first BT device and a third BT device, the second BT link comprising an audio link to communicate audio data between the third BT device, as an audio source, and the first BT device, as an audio sink; and means for causing the first BT device to maintain the role of the central device over the first BT link as long as the second BT link is operated as an active audio link.

24. The apparatus of claim 23 comprising means for causing the first BT device to initiate an other role switch to switch the first BT device from the role of the peripheral device to the role of the central device over the second BT link, based on a determination that the first BT link is to be operated as an other audio link to communicate audio data between the first BT device, as the audio sink, and the second BT device, as the audio source.

* * * * *